(12) United States Patent
Hamakita et al.

(10) Patent No.: US 8,813,904 B2
(45) Date of Patent: Aug. 26, 2014

(54) ELECTRIC POWER STEERING SYSTEM

(71) Applicant: JTEKT Corporation, Osaka (JP)

(72) Inventors: Jun Hamakita, Kashihara (JP);
Michitoshi Mitsumaru, Sakurai (JP);
Yoshitomo Nagai, Kashihara (JP)

(73) Assignee: JTEKT Corporation, Osaka (JP)

( * ) Notice: Subject to any disclaimer, the term of this patent is extended or adjusted under 35 U.S.C. 154(b) by 43 days.

(21) Appl. No.: 13/680,375

(22) Filed: Nov. 19, 2012

(65) Prior Publication Data

US 2013/0133974 A1 May 30, 2013

(30) Foreign Application Priority Data

Nov. 25, 2011 (JP) ................................ 2011-257993
Sep. 7, 2012 (JP) ................................ 2012-196868

(51) Int. Cl.
| | | |
|---|---|---|
| *B62D 5/04* | (2006.01) | |
| *F16C 23/08* | (2006.01) | |
| *F16H 55/24* | (2006.01) | |
| *F16C 27/04* | (2006.01) | |
| *F16H 57/021* | (2012.01) | |

(52) U.S. Cl.
CPC .............. *B62D 5/0403* (2013.01); *F16C 23/08* (2013.01); *F16H 55/24* (2013.01); *F16H 2057/0213* (2013.01); *F16C 27/04* (2013.01); *B62D 5/0409* (2013.01)
USPC ........................................................ 180/444

(58) Field of Classification Search
CPC ................ B62D 5/0409; B62D 5/0403; F16H 2057/0213; F16H 55/24; F16C 27/04; F16C 23/08
USPC .......................................... 180/443, 444, 446
See application file for complete search history.

(56) References Cited

U.S. PATENT DOCUMENTS

| | | | | |
|---|---|---|---|---|
| 3,848,477 | A  * | 11/1974 | Giandinoto et al. | ............. 74/425 |
| 7,401,678 | B2 * | 7/2008 | Yuasa et al. | .................... 180/444 |
| 8,001,866 | B2 * | 8/2011 | Song et al. | ...................... 74/409 |
| 2007/0062754 | A1 | 3/2007 | Kim et al. | |
| 2008/0006472 | A1 | 1/2008 | Song et al. | |

FOREIGN PATENT DOCUMENTS

JP      A-2010-116090      5/2010

OTHER PUBLICATIONS

Nov. 26, 2013 Extended Search Report issued in European Patent Application No. 12193816.1.

* cited by examiner

*Primary Examiner* — Kevin Hurley
(74) *Attorney, Agent, or Firm* — Oliff PLC

(57) ABSTRACT

There is provided an urging mechanism that elastically urges a second end portion of a worm shaft that is supported so as to be pivotable about a first end portion. The urging mechanism is configured to adjust a backlash between the worm shaft and a worm wheel by elastically urging the second end portion in a perpendicular direction that is perpendicular to a direction in which an inter-axis distance between the worm shaft and the worm wheel increases and decreases, in a state where increases and decreases in the inter-axis distance is prevented.

4 Claims, 4 Drawing Sheets

ELECTRIC POWER STEERING SYSTEM

INCORPORATION BY REFERENCE/RELATED APPLICATION

This application claims priority to Japanese Patent Applications No. 2011-257993 filed on Nov. 25, 2011 and No. 2012-196868 filed on Sep. 7, 2012 the disclosure of which, including the specification, drawings and abstract, is incorporated herein by reference in its entirety.

BACKGROUND OF THE INVENTION

1. Field of the Invention

The invention relates to an electric power steering system.

2. Discussion of Background

Japanese Patent Application Publication No. 2010-116090 (JP 2010-116090 A) describes a worm reducer that includes inter-axis distance reduction urging means and lead angle correction urging means, as urging means for urging a bearing that supports a worm shaft toward a bearing hole portion. The inter-axis distance reduction urging means reduces the inter-axis distance between the worm shaft and a worm wheel. The lead angle correction urging means urges the bearing in such a direction that the lead angle of a worm is larger than the lead angle of the worm wheel.

According to JP 2010-116090 A, the bearing hole needs to be formed into a shape that allows the bearing to be displaced in two directions, that is, in such a direction that the inter-axis distance is increased or decreased to adjust a backlash (a clearance between tooth flanks) and such a direction that the lead angle of the worm is increased to increase the contact ratio between the tooth flanks. Therefore, it is difficult to form the bearing hole. In addition, actually, the worm shaft is urged in the direction of a resultant force of an urging force that is generated by the inter-axis distance reduction urging means and an urging force that is generated by the lead angle correction urging means. Therefore, there is a possibility that the backlash will not be accurately adjusted due to the influence of variations, such as a manufacturing error of each urging means.

The direction in which a worm shaft with a lead angle is rotated for steering to the left is opposite to the direction in which the worm shaft is rotated for steering to the right. Therefore, friction torque between tooth flanks differs between steering to the left and steering to the right. As a result, the steering feel differs between steering to the left and steering to the right.

SUMMARY OF THE INVENTION

The invention provides an electric power steering system that is able to accurately adjust a backlash and that is able to suppress a difference in the steering feel between steering to the right and steering to the left.

According to a feature of an example of the invention, an urging mechanism that elastically urges a second end portion of a worm shaft to adjust a backlash urges the second end portion in a perpendicular direction that is perpendicular to a direction in which an inter-axis distance increases and decreases, in a state where increases and decreases in the inter-axis distance are prevented.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
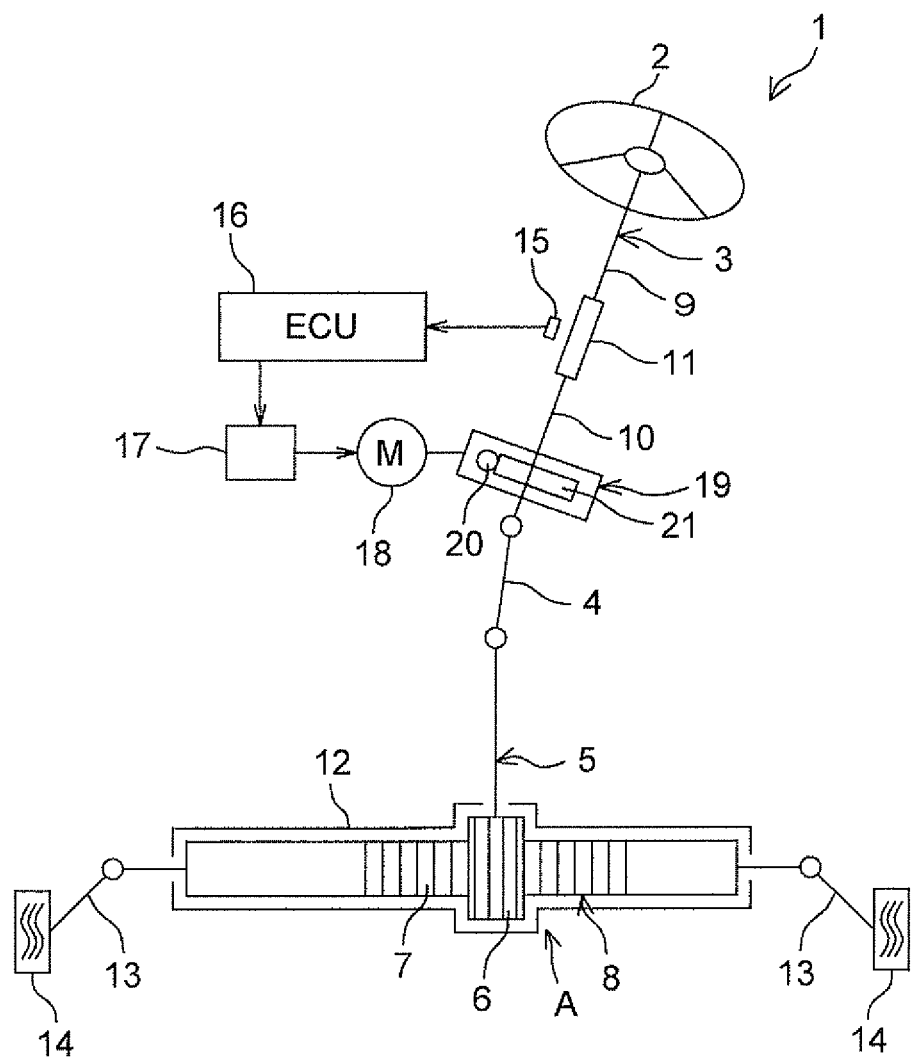
FIG. 1 is a schematic view of an electric power steering system according to an embodiment of the invention.

FIG. 1 is a schematic view that shows the schematic configuration of an electric power steering system 1 that includes a worm reducer 19 according to an embodiment of the invention. As shown in FIG. 1, the electric power steering system 1 includes a steering shaft 3, a pinion shaft 5 and a rack bar 8. The steering shaft 3 is coupled to a steering member 2 such as a steering wheel. The pinion shaft 5 is coupled to the steering shaft 3 via an intermediate shaft 4. The rack bar 8 has a rack 7 that is in mesh with a pinion 6 formed in the pinion shaft 5, and serves as a steered shaft that extends in the lateral direction of an automobile. The pinion shaft 5 and the rack bar 8 constitute a rack-and-pinion mechanism A that serves as a steering mechanism.

The steering shaft 3 is formed of an input shaft 9 coupled to the steering member 2 and an output shaft 10 coupled to the pinion shaft 5. The input shaft 9 and the output shaft 10 are coupled to each other via a torsion bar 11 so as to be rotatable relative to each other on the same axis. The rack bar 8 is supported by a rack housing 12 via a plurality of bearings (not shown) so as to be able to make a linear reciprocating motion. End portions of the rack bar 8 protrude on respective sides of the rack housing 12, and steered wheels 14 are coupled to the respective end portions via tie rods 13 and knuckle arms (not shown).

The steering shaft 3 rotates as the steering member 2 is operated. The rotation of the steering shaft 3 is converted into a linear reciprocating motion of the rack bar 8 in the lateral direction of a vehicle body via the pinion 6 and the rack 7. Thus, the steered wheels 14 are steered. A steering torque applied to the steering member 2 is detected by a torque sensor 15 on the basis of a relative rotational displacement between the input shaft 9 and the output shaft 10. The torque sensor 15 is provided near the steering shaft 3. The torque value detected by the torque sensor 15 is provided to an ECU 16. The ECU 16 executes, via a drive circuit 17, drive control of an electric motor 18 for assisting a steering operation, on the basis of the torque value, a vehicle speed provided from a vehicle speed sensor (not shown), and the like. The rotation of the electric motor 18, which is output through control by the ECU 16, is reduced in speed by the worm reducer 19, and is then transmitted to the output shaft 10. The force transmitted to the output shaft 10 is transmitted to the rack bar 8 via the pinion shaft 5. In this way, a steering operation is assisted.

Figure 2:
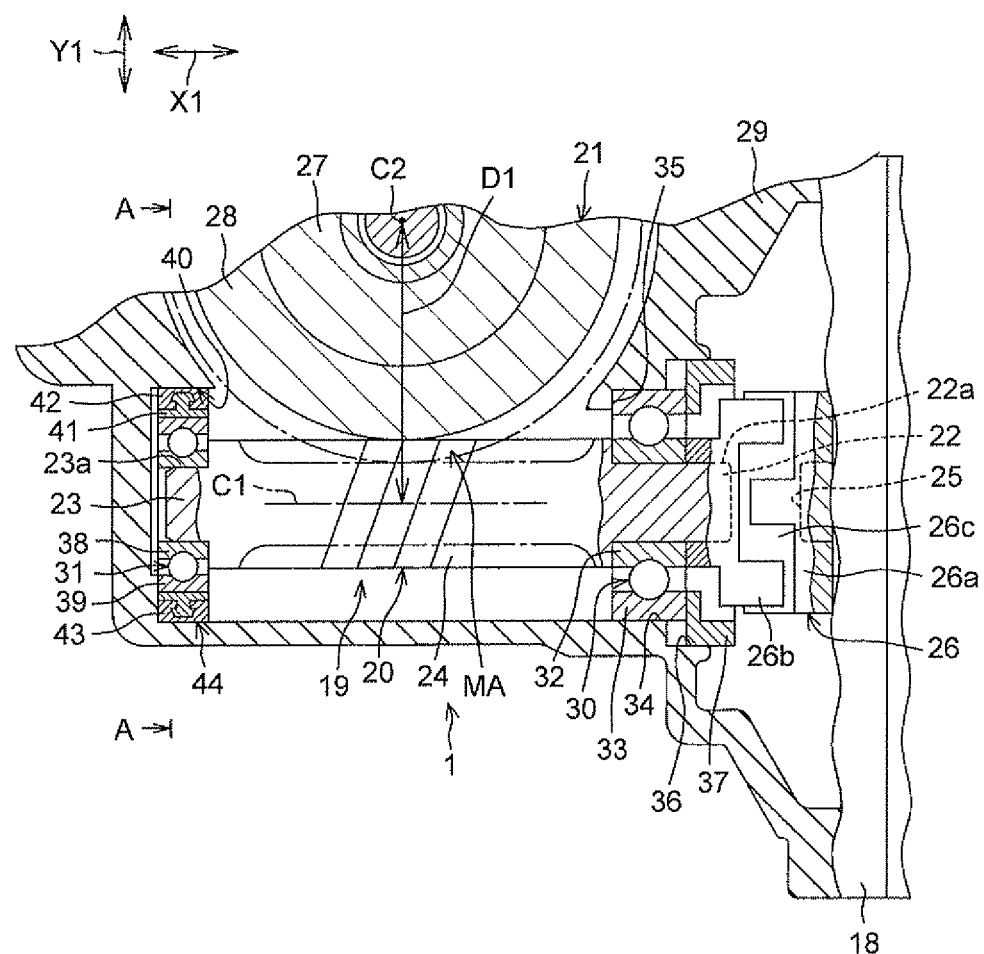
FIG. 2 is a sectional view of a worm reducer of the electric power steering system.

FIG. 2 is a sectional view that shows the configuration of the worm reducer 19 provided in the electric power steering system 1 and portions near the worm reducer 19. The worm reducer 19 includes a worm shaft 20 and a worm wheel 21. The worm shaft 20 serves as a drive gear, and is rotated by the electric motor 18. The worm wheel 21 serves as a driven gear, and is in mesh with the worm shaft 20. Lubricant, such as grease, is supplied in at least a meshing area MA between the worm shaft 20 and the worm wheel 21.

The worm shaft 20 has a first end portion 22 and a second end portion 23. A worm 24 is formed at a middle portion between the first end portion 22 and the second end portion 23. The first end portion 22 is coaxially coupled to a rotary shaft 25 of the electric motor 18 via a coupling 26. With this configuration, the power output from the electric motor 18 is transmitted to the worm shaft 20. The coupling 26 includes a first member 26a, a second member 26b and an elastic member 26c. The first member 26a is coupled to the rotary shaft 25 of the electric motor 18 so as to be rotatable together with the rotary shaft 25. The second member 26b is coupled to the first end portion 22 of the worm shaft 20 so as to be rotatable together with the first end portion 22 of the worm shaft 20. The elastic member 26c couples the first member 26a and the second member 26b to each other such that torque is transmittable.

The worm wheel 21 includes an annular metal member 27 and a synthetic resin member 28. The metal member 27 is connected to the output shaft 10 so as to be rotatable together with the output shaft 10. The synthetic resin member 28 surrounds the metal member 27, and teeth are formed on the outer periphery of the synthetic resin member 28. The metal member 27 is inserted in a die, for example, at the time of resin molding of the synthetic resin member 28. The worm wheel 21 is coupled to the output shaft 10 so as to be rotatable together with the output shaft 10 and axially immovable relative to the output shaft 10. The worm shaft 20 and the worm wheel 21 are accommodated in a gear housing 29.

A first bearing 30 is arranged at the first end portion 22 of the worm shaft 20. A second bearing 31 is arranged at the second end portion 23 of the worm shaft 20. An inner ring 32 of the first bearing 30 is fitted to an outer periphery 22a of the first end portion 22 so as to be rotatable together with the first end portion 22 of the worm shaft 20. An outer ring 33 of the first bearing 30 is supported in a first bearing hole 34 formed in the gear housing 29. The outer ring 33 is held in an axial direction X1 of the worm shaft 20 by a step 35 formed at one end of the first bearing hole 34 and a threaded member 37 fitted to a threaded hole 36 contiguous with the first bearing hole 34.

An inner ring 38 of the second bearing 31 is fitted to an outer periphery 23a of the second end portion 23 so as to be rotatable together with the second end portion 23 of the worm shaft 20. An outer ring 39 of the second bearing 31 is surrounded by a ring-shaped member 41 interposed between the inner wall of the gear housing 29, which defines a second bearing hole 40, and an outer periphery 39a of the outer ring 39. The ring-shaped member 41 is held by a pair of elastic members 42, 43 in a direction Y1 (hereinafter, referred to as "inter-axis distance adjustment direction Y1) in which an inter-axis distance D1 (which corresponds to the distance between a central axis C1 of the worm shaft 20 and a central axis C2 of the worm wheel 21) between the worm shaft 20 and the worm wheel 21. The elastic members 42, 43 constitute an elastic support mechanism 44 that urges the second end portion 23 of the worm shaft 20 toward a neutral position in the inter-axis distance adjustment direction Y1.

Figure 3:
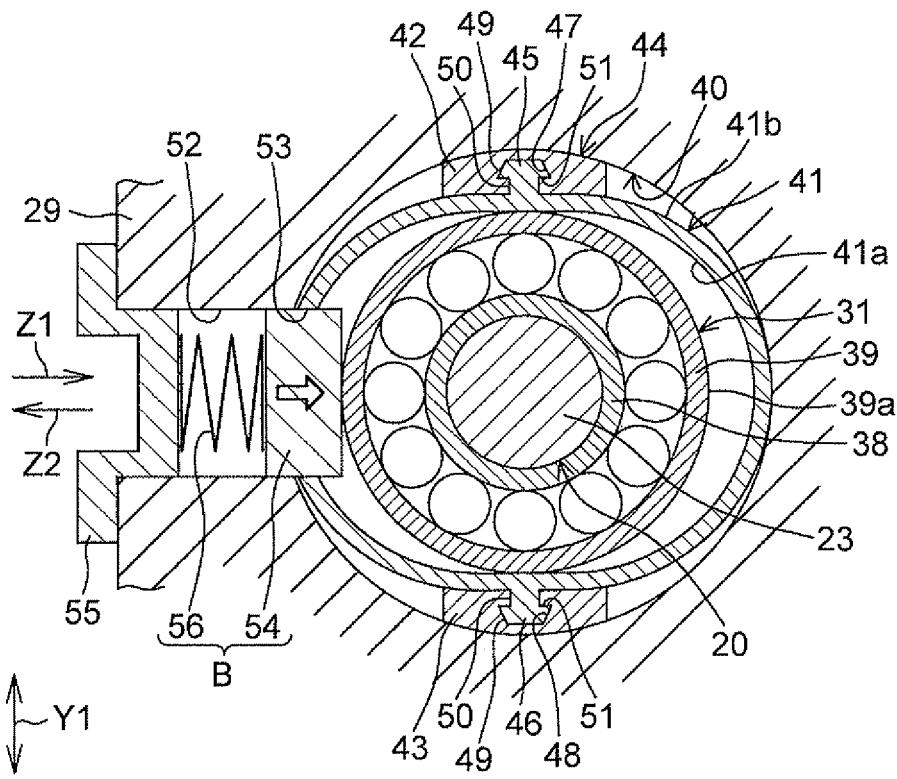
FIG. 3 is a sectional view taken along the line A-A in FIG. 2.

FIG. 3 shows a sectional view taken along the line A-A in FIG. 2. The second bearing hole 40 is formed of a cylindrical hole. The ring-shaped member 41 is formed of an elastically deformable member. An inner periphery 41a of the ring-shaped member 41 forms an elongated hole that supports the second bearing 31 such that the second bearing 31 is movable in perpendicular directions Z1, Z2 that are perpendicular to both the inter-axis distance adjustment direction Y1 and the axial direction X1 of the worm shaft 20. The longitudinal direction of the elongated hole corresponds to the perpendicular directions Z1, Z2.

That is, the ring-shaped member 41 is in an annular shape under no-load conditions. However, when the ring-shaped member 41 is held by the elastic members 42, 43 in the inter-axis distance adjustment direction Y1, the ring-shaped member 41 becomes relatively short in the inter-axis distance adjustment direction Y2 and becomes relatively long in the perpendicular directions Z1, Z2. The elastic members 42, 43 both are elastically compressed in the inter-axis distance adjustment direction Y1, and elastically support the second end portion 23 of the worm shaft 20 at the neutral position in the inter-axis distance adjustment direction Y1 via the second bearing 31 by applying oppositely-directed elastic repulsions to the ring-shaped member 41.

At least a sliding portion of the ring-shaped member 41 is preferably formed of a low-friction member in order to suppress friction resistance at the time when the second bearing 31 moves in the perpendicular directions Z1, Z2. The low-friction member used for the ring-shaped member 41 may be, for example, a resin member such as a fluororesin member, or a metal member such as a stainless steel member. Engaging protrusions 45, 46 are formed on an outer periphery 41b of the ring-shaped member 41 so as to protrude in opposite directions along the inter-axis distance adjustment direction Y1. The engaging protrusions 45, 46 serve as a pair of locking portions that lock the elastic members 42, 43, respectively. The elastic members 42, 43 have engaging holes 47, 48, respectively. The engaging holes 47, 48 serve as engaged portions that are engaged with the corresponding engaging protrusions 45, 46 of the ring-shaped member 41.

Each of the engaging protrusions 45, 46 has a head 49 and a body 50 that connects the head 49 to the ring-shaped member 41. A retaining step 51 is formed between the head 49 and the body 50. The elastic members 42, 43 surround and hold the corresponding engaging protrusions 45, 46 in an elastically compressed state.

The electric power steering system 1 includes an urging mechanism B. The urging mechanism B elastically urges the second end portion 23 of the worm shaft 20 in order to adjust a backlash between tooth flanks of the worm shaft 20 and worm wheel 21. The urging mechanism B is configured to adjust a backlash by elastically urging the second end portion 23 in the perpendicular direction Z1 that is perpendicular to the inter-axis distance adjustment direction Y1 in a state where increases and decreases in the inter-axis distance D1 between the worm shaft 20 and the worm wheel 21 are prevented. Specifically, an urging member accommodating hole 52 is formed in the gear housing 29. The urging member accommodating hole 52 extends in the perpendicular direction Z1 so as to communicate with the second bearing hole 40. Similarly, a pressing member retaining hole 53 is formed in the ring-shaped member 41. The pressing member retaining hole 53 extends in the perpendicular directions Z1, Z2. A pressing member 54 having, for example, a columnar shape, which is used to press the outer ring 39 of the second bearing 31 in the perpendicular direction Z1 is retained by one end of the urging member accommodating hole 52 and the pressing member retaining hole 53 so as to be slidable in the perpendicular directions Z1, Z2, in a state where the pressing member 54 lies astride one end of the urging member accommodating hole 52 and the pressing member retaining hole 53.

In addition, a stopper 55 is fixedly fitted to the other end of the urging member accommodating hole 52. An urging member 56, which is formed of, for example, a compression coil spring, is accommodated in the urging member accommodating hole 52. The urging member 56 is interposed in a compressed state between the pressing member 54 and the stopper 55. The urging member 56 urges the second bearing 31 in the perpendicular direction Z1 via the pressing member 54.

Figure 4:
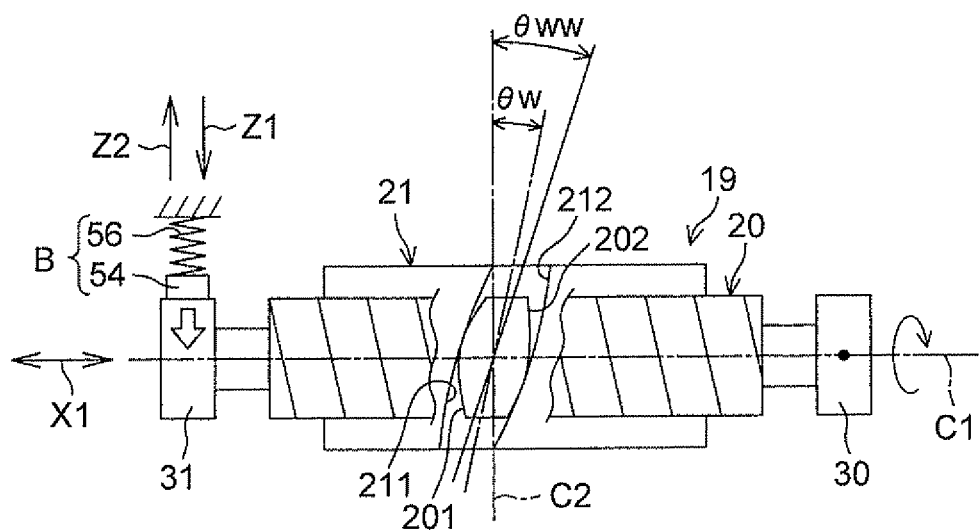
FIG. 4 is a schematic view that shows the positional relationship between a worm shaft and a worm wheel.

As shown in FIG. 4, the perpendicular direction Z1 corresponds to a direction (that is, a lock direction) in which a lead angle θw of the worm shaft 20 becomes smaller than a lead angle θww of the worm wheel 21. As shown in FIG. 4, one tooth flank 201 (meshing-side tooth flank) of the worm shaft 20 is in mesh with a corresponding tooth flank 211 of the worm wheel 21, and the other tooth flank 202 of the worm shaft 20 is in mesh with a corresponding tooth flank 212 of the worm wheel 21.

According to the present embodiment, the urging mechanism B that elastically urges the second end portion 23 of the worm shaft 20 in order to adjust a backlash urges the second end portion 23 in the perpendicular direction Z1 that is perpendicular to the inter-axis distance adjustment direction Y1 in a state where increases and decreases in the inter-axis distance D1 are prevented. Thus, it is possible to suppress a difference in the steering feel between steering to the left and steering to the right, by making a reaction torque at the time of steering to the left and a reaction torque at the time of steering to the right substantially equal to each other. In addition, it is possible to accurately adjust the backlash.

In addition, by setting the urging direction of the urging member 56 to the perpendicular direction Z1 from among the perpendicular direction Z1 and the perpendicular direction Z2, the perpendicular direction Z1 being the direction in which the lead angle θw of the worm shaft 20 becomes smaller than the lead angle θww of the worm wheel 21, it is possible to keep the backlash at zero for a long period of time by compensating for wear of the tooth flanks of the worm shaft 20 and the tooth flanks of the worm wheel 21 and changes due to creep.

In addition, there is provided the elastic support mechanism 44 that elastically supports the second end portion 23 of the worm shaft 20 at the neutral position in the inter-axis distance adjustment direction Y1. Therefore, in normal times, it is possible to prevent the worm shaft 20 from being displaced in the inter-axis distance adjustment direction Y1; whereas in the event of an emergency where an inverse input is received, for example, when the vehicle runs onto a curb, shock absorbing function is performed by the elastic support mechanism 44.

In addition, by urging the second bearing 31 that supports the second end portion 23 of the worm shaft 20 in opposite directions with the use of the elastic members 42, 43 of the elastic support mechanism 44, it is possible to elastically support the second end portion 23 of the worm shaft 20 at the neutral position via the second bearing 31.

Further, the ring-shaped member 41 held by the elastic members 42, 43 elastically deforms, and the inner periphery 41a of the ring-shaped member 41 forms the elongated hole that extends in the longitudinal direction that corresponds to the perpendicular directions Z1, Z2. Therefore, the second bearing 31 is supported by the inner periphery 41a of the ring-shaped member 41 so as to be movable in the longitudinal direction (perpendicular directions Z1, Z2). Thus, it is no longer necessary to form the second bearing hole 40 of the gear housing 29 into an elongated shape. As a result, it is possible to reduce the manufacturing cost.

Figure 5:
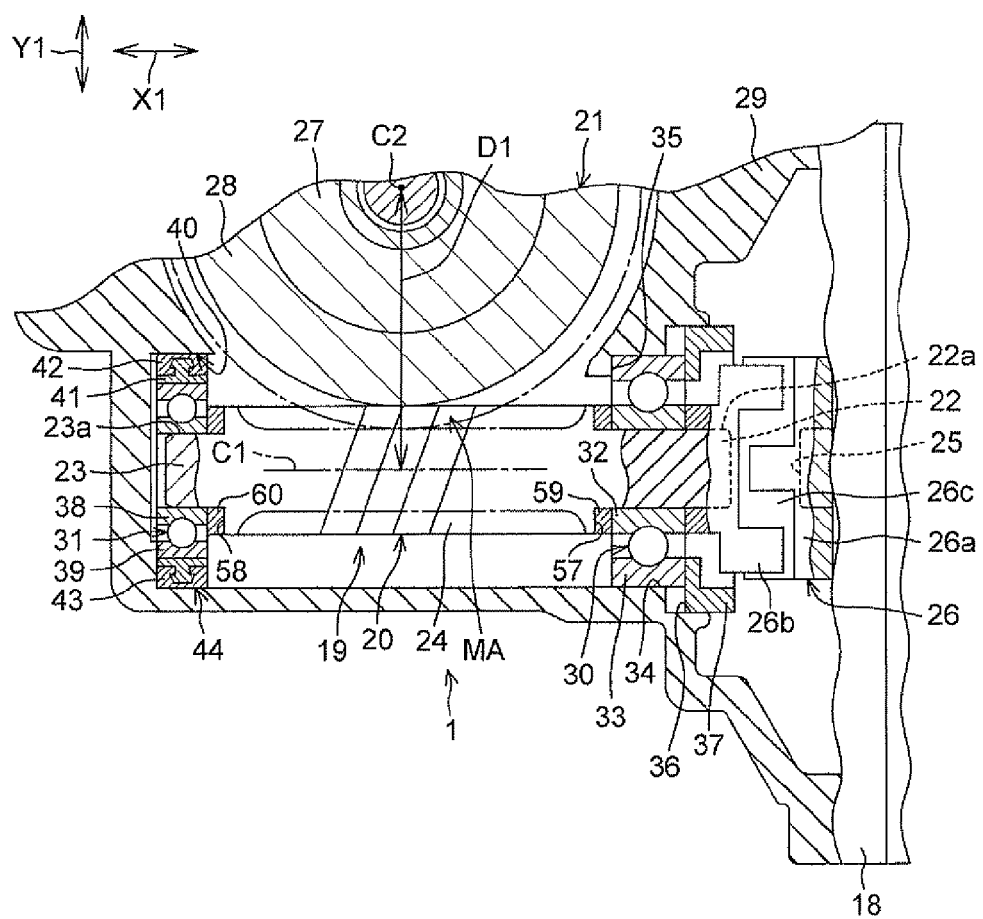
FIG. 5 is a sectional view of a worm reducer of an electric power steering system according to another embodiment of the invention.

The invention is not limited to the above-described embodiment. For example, as shown in FIG. 5, the inner ring 32 of the first bearing 30 and the inner ring 38 of the second bearing 31 may be loosely fitted to the corresponding end portions (the first end portion 22 and the second end portion 23) of the worm shaft 20, and then a pair of elastic members 59, 60 that elastically urge the worm shaft 20 in opposite directions along the axial direction X1 may be interposed between an end face of the inner ring 32 and a positioning step 57 of the worm shaft 20 and an end face of the inner ring 38 and a positioning step 58 of the worm shaft 20, respectively. That is, a backlash removal mechanism that removes a backlash by elastically urging the worm shaft 20 in the axial direction X1 may be added.

In addition, in the embodiment shown in FIG. 3, the urging member 56 urges the second bearing 31 via the pressing member 54. Alternatively, the pressing member 54 may be omitted and the urging member 56 may directly press and urge the second bearing 31 (not shown).

In addition, in the embodiment shown in FIG. 3, an elongated hole is formed by the ring-shaped member 41, by elastically deforming the ring-shaped member 41. Alternatively, the ring-shaped member 41 may be omitted and the second bearing hole 40 itself may be formed into an elongated shape (not shown).

What is claimed is:

1. An electric power steering system, comprising:
 a worm reducer including a worm shaft that has a first end portion and a second end portion and that is supported so as to be pivotable about the first end portion, and a worm wheel that is in mesh with the worm shaft, the worm reducer reducing a speed of rotation of an electric motor for assisting a steering operation; and
 an urging mechanism that elastically urges the second end portion of the worm shaft to adjust a backlash between the worm shaft and the worm wheel,
 wherein the urging mechanism is configured to adjust the backlash by elastically urging the second end portion in one of perpendicular directions that are perpendicular to a direction in which an inter-axis distance between the worm shaft and the worm wheel increases and decreases, in a state where an increase and a decrease in the inter-axis distance are prevented, and
 wherein an urging direction of the urging mechanism is a direction in which a lead angle of the worm shaft becomes smaller than a lead angle of the worm wheel, and which is the one of the perpendicular directions.

2. The electric power steering system according to claim 1, further comprising:
 an elastic support mechanism that elastically supports the second end portion at a neutral position in the direction in which the inter-axis distance increases and decreases.

3. The electric power steering system according to claim 2, further comprising:
 a gear housing that accommodates the worm shaft and the worm wheel; and
 a bearing that is retained in a bearing hole, which is formed in the gear housing, via the elastic support mechanism, and that supports the second end portion, wherein
 the elastic support mechanism includes a pair of elastic members that urge the bearing in opposite directions so as to elastically support the second end portion at the neutral position via the bearing.

4. The electric power steering system according to claim 3, further comprising:
 an elastically deformable ring-shaped member that surrounds an outer periphery of the bearing in a state where the ring-shaped member is held by the pair of elastic members, wherein the bearing is supported by the elastically deformed ring-shaped member so as to be movable in the perpendicular directions corresponding to a longitudinal direction of an elongated hole defined by an inner periphery of the ring-shaped member.

\* \* \* \* \*